J. S. MILLER.
SEWAGE SEPARATOR.
APPLICATION FILED JULY 5, 1911.
1,019,907.
Patented Mar. 12, 1912.
3 SHEETS—SHEET 1.
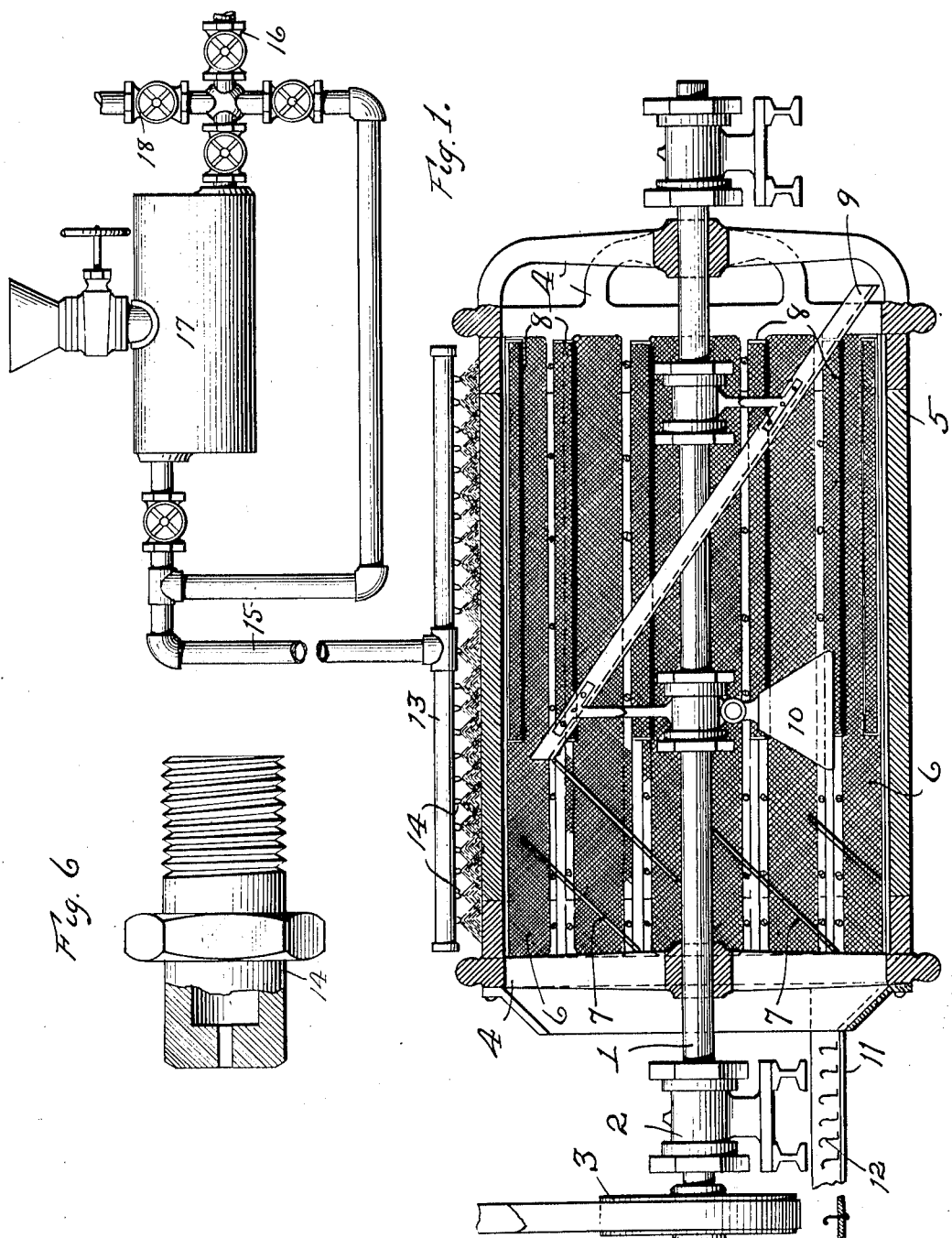
WITNESSES
JOR Kelly.
M. M. Fry.
JAMES S. MILLER, INVENTOR
by
Ed. A. Kelly J. S. MILLER.
SEWAGE SEPARATOR.
APPLICATION FILED JULY 5, 1911.
1,019,907.
Patented Mar. 12, 1912.
3 SHEETS—SHEET 2.
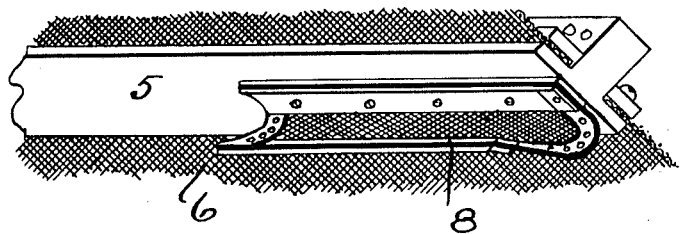
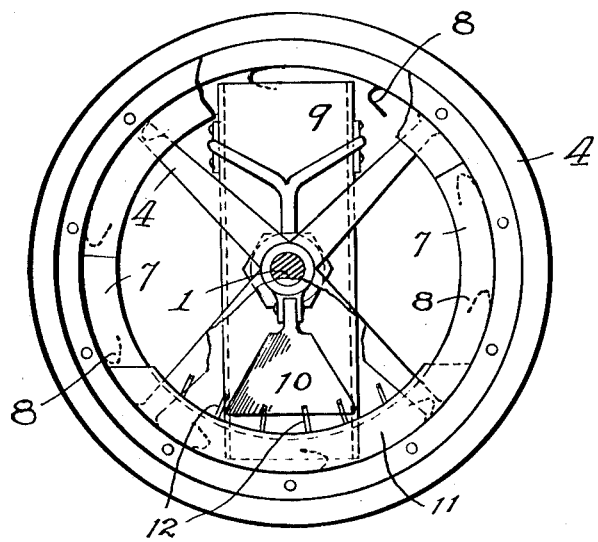
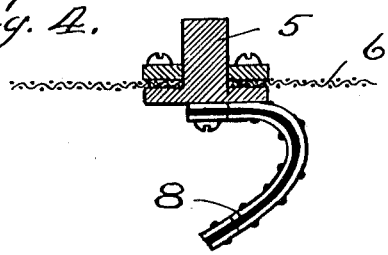
JAMES S. MILLER, Inventor
Witnesses

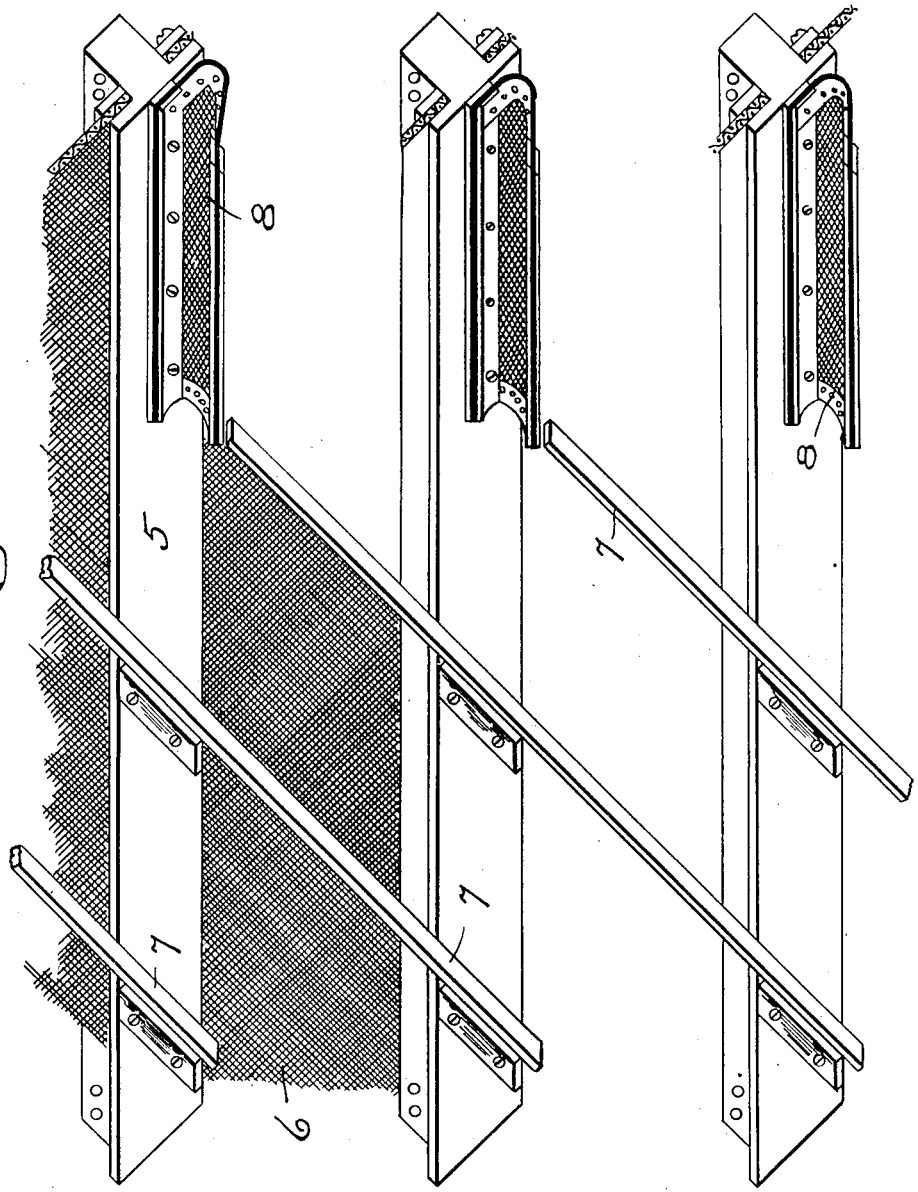

UNITED STATES PATENT OFFICE.

JAMES S. MILLER, OF READING, PENNSYLVANIA.

SEWAGE-SEPARATOR.

1,019,907.  Specification of Letters Patent.  Patented Mar. 12, 1912.

Application filed July 5, 1911. Serial No. 636,826.

*To all whom it may concern:*

Be it known that I, JAMES S. MILLER, a citizen of the United States, residing at Reading, in the county of Berks and State of Pennsylvania, have invented certain new and useful Improvements in Sewage-Separators, of which the following is a specification.

This invention relates to improvements in sewage separators, and the object in the present instance is to provide a convenient means for successfully handling the sewage as it is received from the sewer pipes, so that the solids may be screened from the liquid.

The invention consists of a revolving cylindrical screen, provided with an inlet at one end; means for forcing the sewage forward in the cylinder; buckets for raising the sewage, and a counter-balanced trough into which the buckets are adapted to deposit the sewage, the trough being inclined and passing out the sewage from the forward end of the cylinder. During the progress of its passage through the cylinder, the sewage is thoroughly strained, as the cylinder is covered with a wire mesh screen, as is also each of the buckets, while the trough or chute is provided with a perforated bottom.

A further object is to provide means for cleansing the screen in the cylinder, which consists of a spray leading from a water supply that is provided with means for heating the water as well as means for injecting into it a solution of soda or like cleansing element.

The invention is more fully described in the following specification and clearly illustrated in the accompanying drawings, in which:—

Figure 1 is a longitudinal, central sectional view of my separator. Fig. 2 is an end view of the cylinder. Fig. 3 is a detail showing one of the buckets and a portion of one of the longitudinal cylinder bars. Fig. 4 is an end view, partly in section, of one of the buckets, showing how the bucket and screen is attached. Fig. 5 shows a portion of the inside of the cylinder, showing the screw blades and the buckets and their relative positions on the cylinder bars. Fig. 6 shows one of the spray nozzles in detail.

The numeral 1 designates a power shaft, mounted in suitable supports 2 and driven by a pulley 3. On this shaft I mount a cylinder, made up of two end spiders 4, connected by a series of longitudinal bars 5, while the space between the bars is provided with sections of screen of comparatively fine wire mesh, 6. On the inside of the cylinder, near the forward end, that is, near the end at which the sewage enters, I provide a series of screw blades 7, each of which is secured to the longitudinal bars 5, and all of which are so arranged that they will take up and force the sewage along in the cylinder as it is turned on the shaft. This is accomplished by arranging the blades so that each will form a portion of a convolution of the screw, so that the sewage will be taken up by one blade as it passes off the end of the preceding one. On the inside of the cylinder, just forward of the blades 7, I secure a series of longitudinal buckets 8, one of which is secured to each of the bars 5; these buckets are formed of wire mesh screen.

In the center of the cylinder, I place a trough or chute 9, suspended from the central shaft 1 and arranged at an incline, with its forward or lower end projecting beyond the end of the screen cylinder and partly through the spider 4. This chute is provided with a counter-balance weight 10 which maintains it in proper position while the cylinder is revolving, the chute being provided with an aperture through which the shaft passes. At the forward end of the cylinder, where the sewage enters it, I provide an inlet trough 11, which trough is provided with a series of hooks 12.

The numeral 13 designates the spray nozzle. This is arranged across the top of the cylinder, and is provided with a plurality of outlets 14 and is connected by a pipe 15 to the water supply 16.

The numeral 17 designates a tank in which any suitable cleansing material such as soda may be placed. This tank is in communication with the water supply and is also provided with a steam pipe connection 18. When the water valve 16 is opened the water will pass to the spray and thoroughly cleanse the screen in the cylinder. When it is desired to apply hot water the steam valve 18 is opened, and when it is desired to add the cleaning compound, the valves controlling the tank 17 are opened, which will permit the cleanser to mingle with the water.

The operation of the screen is as follows:—The sewage enters by way of the trough 11, where it is freed from rags or like objects by means of the hooks 12. It then passes into the cylinder which is revolving, and the screw blades 7 will force forward the solid substances while a great portion of the liquid will be screened through the cylinder. The action of the blades will force the sewage forward until it is picked up by the revolving buckets 8, which will further screen it while it is being carried up to the top of the cylinder, where it is dropped out of the buckets into the balanced chute 9, which, being inclined, will convey the residue out through the forward end of the cylinder, and into any desired receptacle.

It is evident that the screen in the cylinder and in the buckets will become clogged in use, and for this purpose I have provided the cleaning means above described so that the device may be kept constantly in operative condition.

Having thus fully described my invention, what I claim is:

In a sewage separator, the combination of a cylinder made up of a pair of spiders, a series of longitudinal bars and wire screen sections connecting the bars; a power shaft on which the cylinder is mounted; a series of screw blades secured to the inside of the longitudinal bars; a series of wire mesh buckets secured to the inside of the cylinder; a central, inclined conveyer chute supported on the power shaft inside the cylinder; a counter balance for keeping the chute in normal position when the cylinder revolves and means comprising a series of spray nozzles for cleansing the screen sections in the cylinder.

In testimony whereof I affix my signature in presence of two witnesses.

JAMES S. MILLER.

Witnesses:
 Ed. A. Kelly,
 Clara E. Young.